No. 843,796. PATENTED FEB. 12, 1907.
D. D. CULVER.
AUTOMOBILE GEARING.
APPLICATION FILED MAR. 16, 1906.
2 SHEETS—SHEET 2.
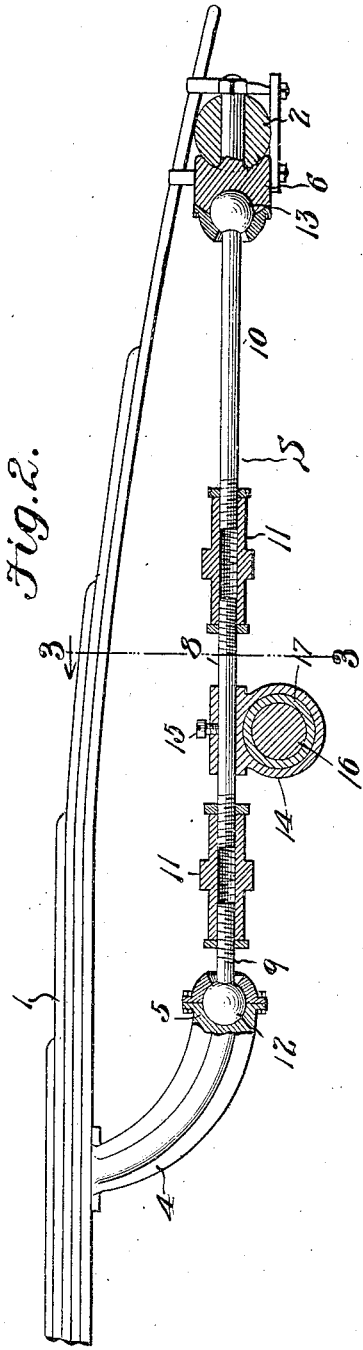
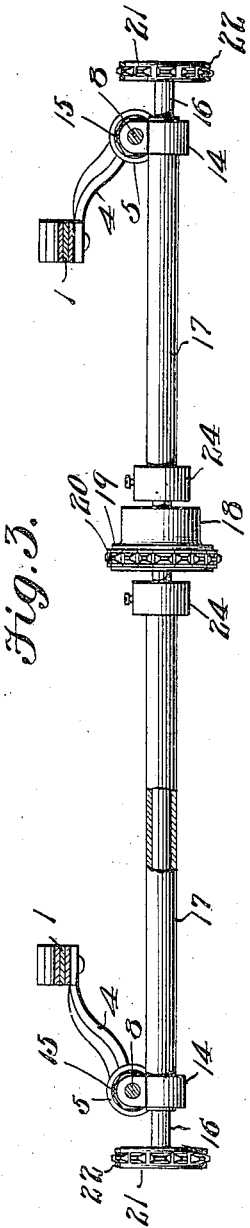
Witnesses:
Darwin D. Culver, Inventor.
By
Attorneys

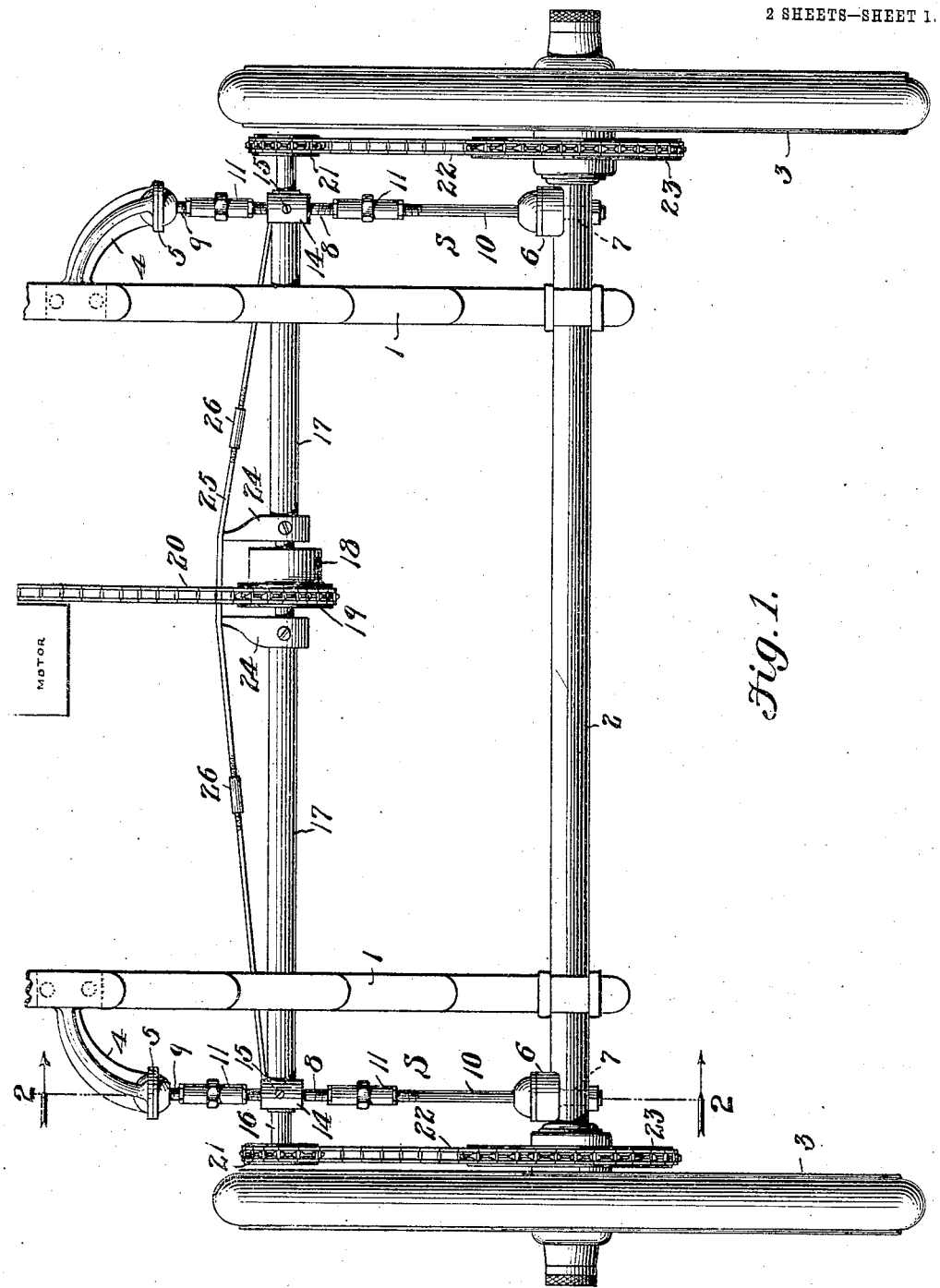

UNITED STATES PATENT OFFICE.

DARWIN DELOS CULVER, OF AURORA, ILLINOIS.

AUTOMOBILE-GEARING.

No. 843,796. Specification of Letters Patent. Patented Feb. 12, 1907.

Application filed March 16, 1906. Serial No. 306,433.

*To all whom it may concern:*

Be it known that I, DARWIN DELOS CULVER, a citizen of the United States, residing at Aurora, in the county of Kane and State of Illinois, have invented a new and useful Automobile-Gearing, of which the following is a specification.

This invention relates to automobiles; and it has particular reference to that part of the automobile-gearing which is used for transmitting power from the motor to the driven hind wheels of the machine.

The principal object of the invention is to provide resilient supporting means for the bearings of the counter-shaft which is used for transmitting power between the motor and the drivers, the purpose being to avoid racking and straining of said shaft and related parts when the machine is in motion. Other objects are to simplify and improve the construction and operation of the parts of the device.

With these and other ends in view, which will readily appear as the nature of the invention is better understood, the same consists in the improved construction and novel arrangement and combination of parts, which will be hereinafter fully described, and particularly pointed out in the claims.

In the accompanying drawings has been illustrated a simple and preferred form of the invention, it being, however, understood that no limitation is necessarily made to the precise structural details therein exhibited, but that changes, alterations, and modifications within the scope of the invention may be made when desired.

In the drawings, Figure 1 is a top plan view of the rear portion of an automobile constructed and equipped with the principles of the invention. Fig. 2 is a sectional elevation taken on the plane indicated by the line 2 2 in Fig. 1. Fig. 3 is a sectional detail view taken on the plane indicated by the line 3 3 in Fig. 2.

Corresponding parts in the several figures are indicated throughout by similar characters of reference.

The invention has been shown as applied to a motor-vehicle having side springs 1 1, the rear ends of which are supported by the rear axle 2, upon which the driving-wheels 3 3 are mounted. Suitably connected with the side springs 1 1 are brackets 4 4, which are provided with terminal sockets 5. Similar sockets 6 6 are secured upon the axle 2, as by means of clips 7.

S S are stay-rods, each of which is composed of a middle section 8 and front and rear end sections 9 and 10. The middle section of each stay-rod has right and left threaded ends that are connected, by means of right and left threaded sleeves or turnbuckles 11, with the front and rear sections 9 and 10. The front sections 9 have terminal balls 12, and the rear sections 10 have terminal balls 13, said balls being seated in the sockets 5 and 6, respectively. The middle sections 8 of the two stay-rods carry blocks or boxes 14, firmly secured thereon, as by set-screws 15, and affording bearings for the counter-shaft 16, which latter extends through the housing sleeves 17 and casing 18, the latter containing the usual differential gearing, which is no part of the present invention and has not been shown in detail, but which is operatively connected with the sprocket-wheel 19, from which a chain 20 leads to the source of power. The ends of the counter-shaft or the sections of said shaft are equipped with sprocket-wheels 21, that are connected by chains 22 with the sprocket-wheels 23 upon the drivers 3. The housing-sleeves 17 are provided with struts 24 for a truss 25 including turnbuckles 26, whereby it may be tightened, the ends of said truss being securely connected with the blocks 14. This truss serves to take up the forward strain upon the counter-shaft by the driving-chain 20.

It will be seen that under this construction the boxes in which the counter-shaft is mounted for rotation are practically supported by the springs 1 1 and that when the machine is in motion the springs may be compressed without racking or straining the counter-shaft or the transmission-chains. The stay-rods supporting the boxes 14 will move freely in their respective ball-and-socket joints, as will be readily understood, and it will be furthermore seen that by manipulating the turnbuckles 11 the stay-rods may be adjusted to take up slack or to relieve excessive tension upon the chains 20 and 22, thus enabling the parts to be always kept in the best condition for successful operation. The construction is simple, and the invention is capable of being applied to automobiles of ordinary construction without entirely rebuilding the same.

It will be specially noted that in the event of unequal compression of the side springs, causing torsion upon the latter, no racking or torsional strain will be exerted upon the counter-shaft or upon the stay-rods, for the reason that the latter will turn axially upon the ball-and-socket bearings whereby they are supported.

Having thus described the invention, what is claimed is—

1. In a motor-vehicle, the combination of an axle, a body-supporting spring mounted thereon, a stay member connected at its ends with the spring and axle respectively, and a bearing for a counter-shaft carried by the said member.

2. In a motor-vehicle, an axle and springs supported thereby, stay-rods between said springs and axle, boxes supported by the stay-rods, a driven counter-shaft supported for rotation in said boxes, and means for transmitting motion from said counter-shaft to wheels upon the axle.

3. In a motor-vehicle, an axle and springs supported thereby, brackets upon the springs, stay-rods provided with terminal balls having bearings in sockets upon the brackets and the axle, a driven counter-shaft supported for rotation in bearings upon the stay-rods, and means for transmitting motion from the counter-shaft to wheels upon the axle.

4. A wheel-carrying axle and springs terminally supported thereby, in combination with extensible and collapsible stay-rods interposed between the axle and the springs, a driven counter-shaft journaled in bearings upon the stay-rods, and means for transmitting motion from the counter-shaft to the wheels upon the axle.

5. A wheel-carrying axle and springs terminally supported thereby, in combination with extensible and collapsible stay-rods interposed between the axle and the springs and having terminal ball-and-socket joints, a driven counter-shaft journaled in bearings upon the stay-rods, and means for transmitting motion from the counter-shaft to the wheels upon the axle.

6. A wheel-carrying axle, springs terminally supported thereby, brackets upon the springs, stay-rods including middle members and front and rear end members connected extensively and collapsibly with said middle members, terminal balls upon the front and rear end members of the stay-rods, sockets for said balls upon the brackets and the axle, a driven counter-shaft supported for rotation by the middle members of the stay-rods, and means for transmitting motion from the counter-shaft to the wheels upon the axle.

7. In a motor-vehicle, a resiliently-supported driven counter-shaft for transmitting motion between the motor and the drivers, housing-sleeves for said shaft having struts, and a truss engaging said struts and having tightening means.

8. In a motor-vehicle, an axle, springs supported thereby, brackets upon the springs, stay-rods having ball-bearings upon the brackets and the axle, a driven counter-shaft supported for rotation by the stay members, housing-sleeves for said shaft having struts, a truss engaging said struts and having tightening means, and means for transmitting motion from the counter-shaft to the wheels upon the axle.

In testimony that I claim the foregoing as my own I have hereto affixed my signature in the presence of two witnesses.

DARWIN DELOS CULVER.

Witnesses:
E. B. DORCHESTER,
C. C. THOMAS.